United States Patent [19]

Skoli

[11] 4,148,338

[45] Apr. 10, 1979

[54] CHECK VALVE

[75] Inventor: Sigmund P. Skoli, Elmwood Park, Ill.

[73] Assignee: Mojonnier Bros. Co., Chicago, Ill.

[21] Appl. No.: 827,895

[22] Filed: Aug. 26, 1977

[51] Int. Cl.$^2$ ............................................. F16K 15/06
[52] U.S. Cl. ............................... 137/515.7; 137/454.2; 137/551; 137/543; 251/361
[58] Field of Search ................... 137/515.7, 551, 454.2, 137/541, 515.3, 515.5, 542, 543, 543.13, DIG. 3, 315; 251/148, 150, 151, 152, 361, 363

[56] References Cited

U.S. PATENT DOCUMENTS

| | | | |
|---|---|---|---|
| 818,670 | 4/1906 | Dumbotton | 137/515.7 |
| 1,260,663 | 3/1918 | Gould et al. | 137/541 |
| 2,241,758 | 5/1941 | Baldine | 137/541 |
| 2,351,874 | 6/1944 | Parker | 137/542 X |
| 2,628,063 | 2/1953 | Hollerith | 251/361 |
| 2,729,237 | 1/1956 | Hite | 137/515.7 |
| 2,729,238 | 1/1956 | Hite | 137/515.7 |
| 2,912,218 | 11/1959 | Stillwagon | 251/361 X |
| 3,918,678 | 11/1975 | Rechtsteiner | 251/144 |

Primary Examiner—William R. Cline
Attorney, Agent, or Firm—Olson, Trexler, Wolters, Bushnell & Fosse, Ltd.

[57] ABSTRACT

Improvements in a check valve are disclosed. The check valve contemplated is of the type used to halt fluid flow in a fluid-carrying pipe system, and comprises an annular seat adapted to be mounted in the fluid line, a head-mounting yoke, and a head carried by the yoke and adapted to slide axially into and out of fluid-sealing engagement with the seat. One improvement comprises a pair of valve sleeves extending, respectively, axially upstream and downstream of the valve seat; each valve has a mouth adapted for mating connection with adjacent fluid-carrying pipe structure. Each sleeve terminates adjacent the valve seat in a diagonal flange formation, and a clamp including a V-shaped collar fits over the sleeve flanges so as to urge the sleeves toward the valve seat and toward one another. A gasket having a U-shaped cross section provides a fluid-tight seal between the sleeves and seat. A finger extends radially from the seat through a sealing aperture in the gasket to a position outside the valve and piping structure. This finger includes a tip marked to indicate to an observer the direction in which fluid flow is permitted through the check valve.

8 Claims, 5 Drawing Figures

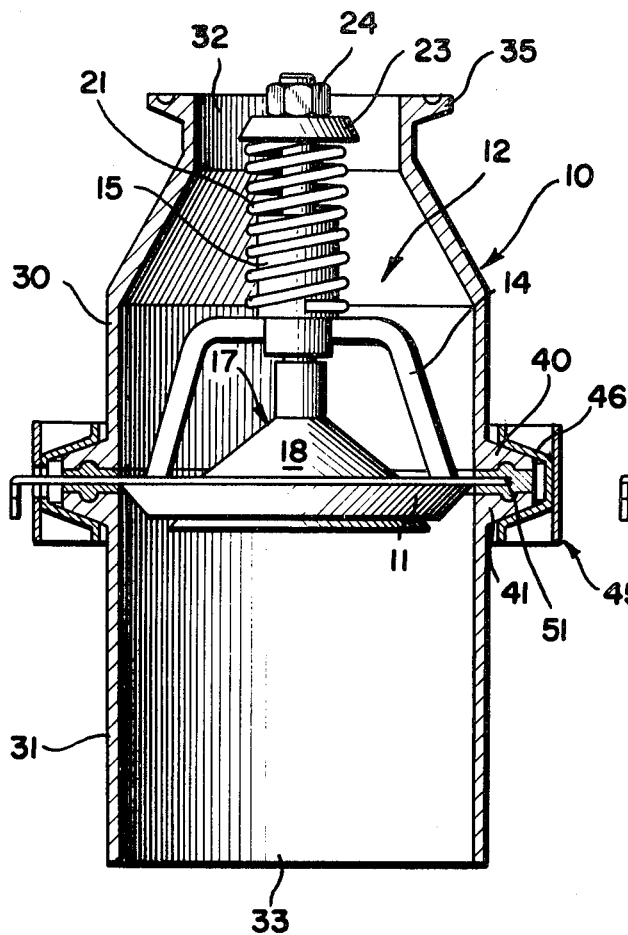
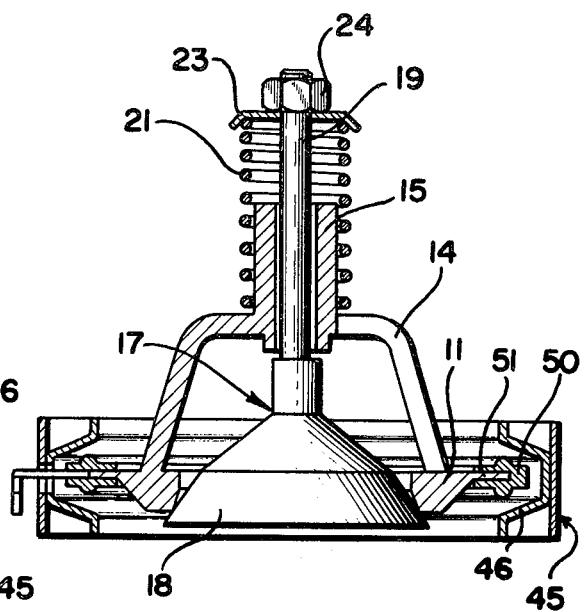
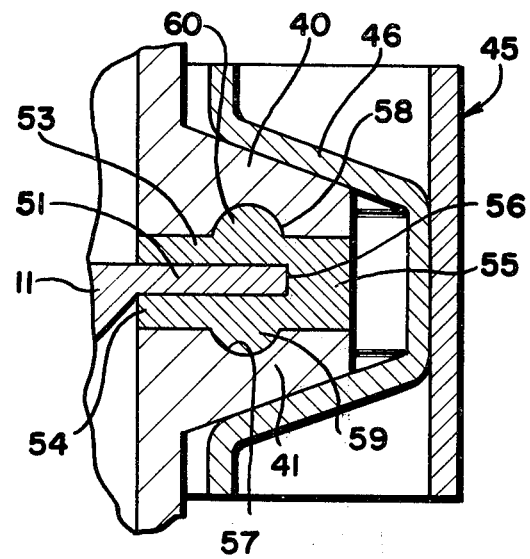
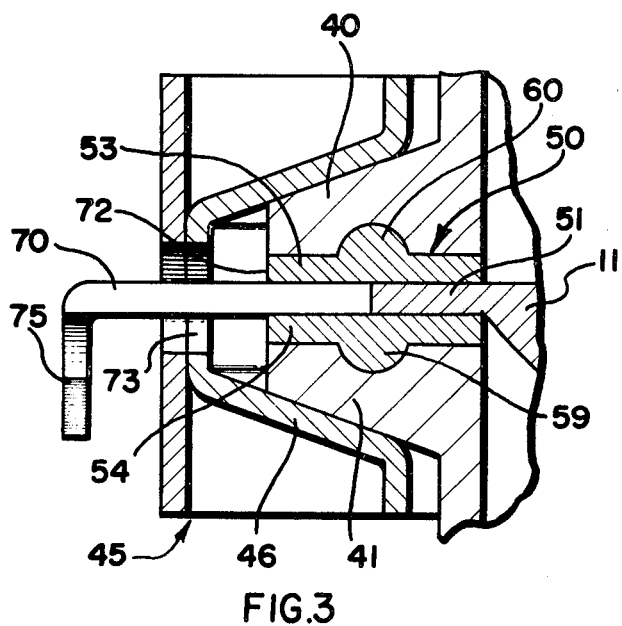
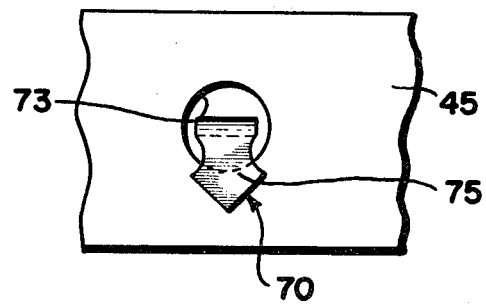

CHECK VALVE

BACKGROUND OF THE INVENTION

This invention relates generally to check valves, and more particularly concerns an inexpensive check valve which can be offered for use in a wide variety of applications.

Check valves have long been known as useful devices for causing single-direction flow through the piping circuits used in dairies, bottling plants, chemical processing installations, and other systems. Indeed, many such check valves can be required in systems of even moderate complexity. The per-unit purchase cost of such valves must be kept to a minimum if the entire system is to be designed and constructed at an attractive cost.

Viewed from another perspective, check valve manufacturers and sellers are presented with an extensive variety of demands for their products. For example, check valves may be required for use in a wide variety of fluid-carrying line sizes. To further complicate the problem, check valves are often needed in lines which are constructed with clamps, or with threaded fasteners, or with weldments, or with other line-component connecting devices. Valve part and valve assembly standardization is, therefore, helpful in reducing valve costs.

It is accordingly the general object of the present invention to provide an inexpensive check valve which can be used in a wide variety of applications. More specifically, it is an object of the invention to provide an inexpensive check valve which can be used with a range of pipe sizes. An ancillary object is to provide such an inexpensive check valve which can be provided, at low cost, with a variety of open mouths or ends for connection to adjacent pipe structure through a corresponding variety of fastener devices. These valve mouths can include mouths adapted for use with weldments, flange fittings, and other connection systems.

Another object of the invention is to provide a check valve of the type described which includes a flow indicator. A more specific object is to provide such a check valve with a low cost flow indicator which is integral with the valve. An ancillary object is to provide such a valve with a flow indicator connected to the valve in a manner which positively prohibits misdirecting or misaligning the flow valve indicator with the valve mechanism. Another related object is to provide such a valve and flow indicator at a relatively low cost. Yet another object is to provide such a valve and flow indicator which are constructed so as to positively avoid the misinstallation of the indicator relative to the valve itself when the valve is being installed in a fluid line.

A further object is to provide a check valve having a flow indicator which shows not only the direction of flow through the valve, but also indicates the exact location of the valve (and more particularly the valve seat) itself.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a sectional view showing a valve embodying the present invention as it appears when installed in a fluid-carrying line;

FIG. 2 is a sectional view similar to FIG. 1 showing the valve and its construction in further detail;

FIG. 3 is a fragmentary sectional view of the valve indicator shown in FIGS. 1 and 2;

FIG. 4 is a fragmentary sectional view somewhat similar to FIG. 3 but showing a portion of the valve structure located diametrically opposite to the portion of FIG. 3; and FIG. 5 is a fragmentary view of the valve flow indicator and associated parts as the indicator appears from outside the valve and the associated flow-conducting fluid line.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning first to FIG. 1, there is shown a check valve assembly 10 embodying the present invention. As shown particularly in FIGS. 1 and 2, an annular valve seat member 11 extends radially or perpendicularly across a fluid-carrying line 12. From the valve seat 11, a yoke 14 extends axially upstream to mount an axially elongated head guide 15. A fluid flow-checking head 17 includes a radially extending base 18 and a slide 19 carried for slideable motion within the slide guide 15. It will be understood that upstream fluid pressure against the head base 18 causes the base to slide axially into and out of fluid-sealing engagement with the valve seat 11.

To urge the base 18 into the illustrated normally closed or seated position as illustrated particularly in FIG. 2, a biasing member such as a coil spring 21 is here positioned so as to surround the slide guide 15 and to engage a head cap 23 affixed to the head slide 19 as by a stopper nut 24. When the free-standing length of the spring is selected so as to place the spring 21 under compression between the yoke 14 and the cap 23 and the valve is fully assembled, the head 17 is drawn axially upwardly as illustrated in FIGS. 1 and 2 into its seated, fluid-flow-stopping position. It will also be understood that attempted fluid flow in an upward direction as illustrated in FIG. 1 will simply serve to more securely seat the head base 18 against the seat 11 and, consequently, more securely halt the attempted fluid flow.

In accordance with the one aspect of the invention, the valve 10 is adapted to be connected to or carried within a wide variety of fluid-carrying lines 12. To this end, the valve seat 11 and other portions of the valve mechanism itself are carried by and within a pair of valve sleeves 30 and 31 which axially extend respectively upstream and downstream of the valve seat 11. Each sleeve 30 and 31 is provided with a mouth 32 and 33, respectively, which is adapted for making connection with adjacent fluid-carrying piping structure (not shown). For example, as illustrated in FIG. 1, one or both mouths 32 can be adapted for connection to other piping structure by crimping-collar-accepting flanges. Alternatively, one or both sleeves 31 can be provided with mouths 33 especially adapted for welded connection to adjacent piping structure. It will be understood that threaded pipe ends, of either the male or female variety, or other connections can, with equal facility, be provided.

In carrying out this aspect of the invention, the check valve can serve not only in its fluid-flow-checking capacity, but can also serve as a pipe adapter to permit the quick and easy connection of piping from one type of system, such as a flared flange system, to another system, such as a welded pipe system. Also in furtherance of the invention, the sleeves 30 and 31 can be provided with mouths 32 and 33 of any diameter. That is, either mouth 32 or 33 can be of diametric size somewhat smaller than, equal to, or somewhat greater than the diametric opening of the seat 11. In this way, too, the check valve and its sleeves 30 and 31 can serve as an adapter between piping systems of various sizes. The adaptation effect can be inexpensively obtained by selecting the appropriate sleeves from a suitable sleeve stock or supply.

To secure the valve seat 11 between the sleeves 30 and 31, the sleeves 30 and 31 terminate adjacent the valve seat 11 in flange formations 40 and 41, respectively, which extend diagonally outwardly and axially toward the valve seat 11 and the opposite sleeve flange 41 and 40 as illustrated particularly in FIGS. 1, 3 and 4. To draw the sleeves 30 and 31 and the associated flanges 40 and 41 axially toward one another and toward the valve seat 11 with a clamping action, a clamp 45 surrounds the flanges 40 and 41. The clamp 45 includes a V-shaped clamp collar 46 which is adapted to fit over the sleeve flanges 40 and 41. When a tensioning device (not shown) is actuated, the clamp 45 and its V-shaped collar 46 are drawn tightly against and over the sleeve flanges 40 and 41 so as to urge the sleeves 30 and 31 toward the valve seat 11 and toward one another. The tensioning device can take the form of an over-center latch, or a hose-clamp-like screw device, or a like tensioning arrangement.

An annular gasket 50 is carried between the sleeve flanges 40 and 41 and the valve 11 to provide a fluid tight seal between the sleeves 30 and 31 and the seat 11 when the collar 45 is drawn tight around the sleeve flanges 40 and 41. To encourage this fluid-tight seal in carrying out the invention, the seat includes a seat flange 51 extending radially outwardly from the seat 11 and the gasket itself can be considered to have a generally U-shaped cross sectional configuration, as most particularly shown in FIG. 4. The gasket legs 53 and 54 of the U-shape extend between the seat flange 51 and the respective sleeve flanges 40 and 41. A bottom or base portion 55 of the gasket U-shaped cross section extends axially across and covers the radial edge 56 of the seat flange 51. As illustrated particularly in FIG. 4, this gasket base portion 55 also extends between the sleeve flanges 40 and 41; together, the gasket cross sectional portions provide a fluid-tight seal between the valve seat 11 and the valve sleeves 30 and 31.

It is a feature of the invention that the valve can be assembled quickly, easily, and at low cost by even inexperienced personnel. To this end, each valve flange 40 and 41 is provided with a recess 57 and 58, and the gasket legs 53 and 54 are, respectively, provided with embossments 59 and 60 adapted to mate with the recesses 57 and 58. This mating action encourages proper flange-gasket mating engagement, and also further encourages fluid-tight sealing action between the gasket 50, seat 11, and sleeves 30 and 31.

It is another feature of the invention that an outside observer can instantly ascertain the direction in which fluid flow is permitted by the check valve 10. To this end, the valve includes a finger 70 which extends from the seat flange 51 radially outwardly through a sealing aperture 72 formed in the gasket 50 and through an aligned aperture 73 formed in the clamp 45. A finger tip 75 is thus positioned outside the gasket 50, the sleeves 30 and 31, and the clamp 45, and is here bent over and otherwise formed to indicate to the observer the direction in which the fluid flow is permitted through the one-way check valve. Here this finger tip 75 includes an arrowhead in which the fluid flow is permitted. It will also be noted that, since the finger 70 extends directly from the valve seat 11, the exact location of the valve seat 11 within the sleeves 30 and 31 and the adjacent piping structure is definitely, dramatically, and accurately indicated.

The invention is claimed as follows:

1. A check valve of the type comprising an annular seat adapted to be mounted in an axially extended fluid-carrying line, a yoke extending axially of the line and seat, a head guide mounted to and extending axially of the yoke, a head having an axially extending slide slidably carried by the yoke head guide and a base adapted to slide axially into and out of fluid-sealing engagement with the seat; a biasing element interposed between the yoke and head to bias the base into engagement with the seat, thereby inhibiting fluid flow in an upstream direction and permitting fluid flow in a downstream direction only when fluid pressure in that downstream direction is sufficient to overcome the biasing effect of the biasing element, a pair of valve sleeves extending, respectively, axially upstream and downstream of the valve seat and having mouths adapted for mating connection with adjacent fluid-carrying structure, each sleeve terminating adjacent the valve seat in a sleeve flange formation having a first surface extending diagonally radially outwardly and axially toward the valve seat and the opposite seat flange, each sleeve flange having a second surface extending radially outwardly in intersecting relationship with the first sleeve flange surface, a seat flange extending radially outwardly between the sleeve flanges, a clamp including a V-shaped collar adapted to fit over the sleeve flange first surfaces and tensioning means for drawing the collar tightly against and over the sleeve flanges so as to urge the sleeves toward the valve seat and toward one another, and gasket means carried between the sleeve flanges and the valve seat to provide a fluid-tight seal between the sleeves and the seat when the collar is drawn tightly around the sleeve flanges, the gasket means being generally U-shaped in cross-sectional configuration, the gasket legs of said U-shaped configuration extending between the seat flange and the respective sleeve flange second surfaces, and the gasket bottom of the U-shaped cross-sectional configuration covering the radial edge of the seat flange and extending between the sleeve flange second surfaces to provide a fluid-tight seal between the valve seat and the valve sleeves, each sleeve flange second surface being provided with at least one annular, axially extending recess located radially inwardly of and spaced apart from the flange periphery, and the gasket being provided with an annular, axially extending embossed portion located radially inwardly of and spaced apart from the gasket periphery and adapted to mate with each sleeve flange second surface recess to encourage proper flange-gasket mating engagement and to further encourage fluid-tight sealing action between the gasket, seat and sleeve.

2. An improvement according to claim 1 including a finger extending radially from said seat flange through a sealing aperture in said gasket, the finger including a tip positioned outside the gasket and the sleeves and being marked to indicate to an observer the direction in which fluid flow is permitted through the one way check valve.

3. An improvement according to claim 2 wherein said collar is provided with a recess through which the finger extends.

4. An improvement according to claim 2 wherein said finger tip includes an arrowhead formation extending axially in the direction in which fluid flow is permitted through the one-way check valve.

5. An improvement according to claim 1 wherein said valve seat defines an orifice through which fluid can flow when the head is out of contact with the seat, and wherein at least one sleeve mouth has a diameter smaller than the valve seat orifice diameter.

6. An improvement according to claim 1 wherein said valve seat defines an orifice through which fluid can flow when the head is out of contact with the seat, and wherein at least one sleeve mouth has a diameter substantially identical with the valve seat orifice diameter.

7. An improvement according to claim 1 wherein at least one sleeve is provided with a mouth adapted for welding attachment to adjacent fluid-carrying structure.

8. An improvement according to claim 1 wherein at least one of said sleeve mouths is at least adapted for clamp attachment to adjacent fluid-carrying structure.

* * * * *